United States Patent
David et al.

(10) Patent No.: US 11,989,103 B2
(45) Date of Patent: May 21, 2024

(54) DEVICE AND A METHOD FOR INDEXING SNAPSHOTS OF MULTIPLE FILE SYSTEMS

(71) Applicant: Huawei Technologies Co., Ltd., Shenzhen (CN)

(72) Inventors: Yehonatan David, Hod Hasharon (IL); Anthony Berkow, Hod Hasharon (IL); Boris Liberman, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 17/684,598

(22) Filed: Mar. 2, 2022

(65) Prior Publication Data

US 2022/0188202 A1 Jun. 16, 2022

Related U.S. Application Data

(63) Continuation of application No. PCT/EP2020/055018, filed on Feb. 26, 2020.

(51) Int. Cl.
*G06F 11/14* (2006.01)
*G06F 16/11* (2019.01)
*G06F 16/22* (2019.01)

(52) U.S. Cl.
CPC ........ *G06F 11/1466* (2013.01); *G06F 16/128* (2019.01); *G06F 16/2246* (2019.01)

(58) Field of Classification Search
CPC ............... G06F 11/1466; G06F 16/128; G06F 16/2246; G06F 16/13; G06F 16/113; G06F 2201/84
USPC ........................................................ 707/625
See application file for complete search history.

(56) References Cited

U.S. PATENT DOCUMENTS

| | | | | |
|---|---|---|---|---|
| 7,624,106 B1 * | 11/2009 | Manley | .................... | G06F 16/16 707/786 |
| 7,716,171 B2 * | 5/2010 | Kryger | .................... | G06F 16/31 707/649 |
| 7,761,456 B1 * | 7/2010 | Cram | .................... | G06F 11/1469 707/754 |
| 8,515,911 B1 * | 8/2013 | Zhou | .................... | G06F 16/1873 707/649 |
| 9,569,446 B1 | 2/2017 | Feathergill et al. | | |
| 9,830,345 B1 * | 11/2017 | Baars | .................... | G06F 16/2246 |
| 11,163,721 B1 * | 11/2021 | Mahuli | .................... | G06F 16/16 |
| 2003/0158873 A1 * | 8/2003 | Sawdon | .................... | G06F 16/10 |

(Continued)

FOREIGN PATENT DOCUMENTS

| | | | | |
|---|---|---|---|---|
| CN | 102483755 A | * | 5/2012 | ......... G06F 12/0246 |
| KR | 20070101288 A | * | 10/2007 | ............. G06F 17/40 |

OTHER PUBLICATIONS

Westenberg et al., "Making Snapshots Searchable Through Indexing", an IP.com Prior Art Database Technical Disclosure, Jun. 26, 2012, pp. 1-3. (Year: 2012).*

*Primary Examiner* — Phuong Thao Cao
(74) *Attorney, Agent, or Firm* — Conley Rose, P.C.

(57) ABSTRACT

A device is configured to index file system names and paths of a single chain of backed-up snapshots. The device is configured to obtain a first snapshot of the file system. Further, the device is configured to scan the first snapshot of the file system to obtain a first scan of the nodes and the tree structure at a first time point. The device is further configured to insert the first scan into a database. Then the device is configured to index the nodes in the database.

20 Claims, 3 Drawing Sheets

(56) References Cited

U.S. PATENT DOCUMENTS

| | | | |
|---|---|---|---|
| 2003/0182313 A1* | 9/2003 | Federwisch | G06F 11/2066 |
| | | | 714/E11.107 |
| 2007/0043790 A1* | 2/2007 | Kryger | G06F 11/1448 |
| 2010/0023548 A1* | 1/2010 | Slott | G06F 16/13 |
| | | | 707/E17.005 |
| 2010/0179959 A1* | 7/2010 | Shoens | G06F 16/128 |
| | | | 707/E17.014 |
| 2011/0173160 A1 | 7/2011 | Kryger | |
| 2012/0233172 A1 | 9/2012 | Skillcorn et al. | |
| 2017/0270138 A1* | 9/2017 | Belov | G06F 16/185 |
| 2017/0364534 A1* | 12/2017 | Zhang | G06F 16/284 |
| 2019/0065508 A1* | 2/2019 | Guturi | G06F 16/2246 |
| 2019/0213089 A1* | 7/2019 | Podge | G06F 16/2246 |
| 2019/0377802 A1* | 12/2019 | Haber | G06F 16/128 |
| 2020/0026612 A1* | 1/2020 | Ben Dayan | G06F 16/128 |
| 2020/0026687 A1* | 1/2020 | Ben Dayan | G06F 16/182 |
| 2020/0151280 A1* | 5/2020 | Moravec | G06F 16/13 |
| 2020/0233751 A1* | 7/2020 | Gupta | G06F 16/9027 |
| 2021/0182273 A1* | 6/2021 | Zdornov | G06F 16/13 |

* cited by examiner

DEVICE AND A METHOD FOR INDEXING SNAPSHOTS OF MULTIPLE FILE SYSTEMS

CROSS-REFERENCE TO RELATED APPLICATIONS

This application is a continuation of International Patent Application No. PCT/EP2020/055018 filed on Feb. 26, 2020. The disclosure of the aforementioned application is hereby incorporated by reference in its entirety.

TECHNICAL FIELD

The present disclosure relates to the field of computer systems with backup mechanisms, in particular, related to a backup system for backing up data of computing devices in a computer network. In order to help a user, who wants to recover a specific file from a backup snapshot, the disclosure provides a solution that allows searching a filename with regular expression across all file systems and snapshots. To this end, the present disclosure provides a device and a method for indexing snapshots of multiple file systems.

BACKGROUND

When a given file system needs to be backed up, a temporary snapshot of that file system is generated to represent the static state of the file system at that particular instant in time. This snapshot is then backed up at block level. As a result, it is not feasible for a user to directly search or browse the backup of this snapshot for specific files.

Therefore, following the backup process, the file system within the snapshot is mounted, in order to scan the entire directory tree of the file system and store information about the names and paths of all the nodes of the file system in a suitable structure. This information might include a name, size, timestamps, device and identifier for each node that is found.

The scan process might typically be performed within a very lightweight virtual machine, in order to mount the file system image. Therefore, ideally the scan process should not consume too much memory regardless of the number of nodes being scanned. A problem is searching in multiple snapshots of multiple machines.

One of the conventional solutions is to use elastic search. However, elastic search does not provide required performances in terms of speed and resource consumption. It is far too slow by an order of magnitude. Some common known solutions require large amounts of memory and central processing unit (CPU) that are not readily available when performing a scan within a lightweight virtual machine, or when performing multiple searches on a single machine.

SUMMARY

In view of the above-mentioned challenges, embodiments of the disclosure aim to provide a device and method improving the conventional solutions. An objective is, in particular, to enable searching a filename with regular expression across all file systems and snapshots, while saving memory and CPU resources. Thus, embodiments of the disclosure aim to create a catalog of file system structure that holds multiple snapshots of the same file system. Another aim is to not consume too much memory regardless of the number of nodes in the file systems being scanned. Further, it is also desirable to efficiently replicate a database to a remote site.

The objective is achieved by the embodiments of the disclosure as described in the enclosed independent claims. Advantageous implementations of the embodiments of the disclosure are further defined in the dependent claims.

A first aspect of the present disclosure provides a device for backing up a file system comprising a plurality of nodes arranged into a tree structure, the device being configured to obtain a first snapshot of the file system, scan the first snapshot of the file system to obtain a first scan of the nodes and the tree structure of the file system at a first time point, insert the first scan into a database, and index the nodes in the database.

After a scan operation and an insert operation, the nodes in the database are indexed to allow for following search and browse operations. In particular, with the device of the first aspect, searching a filename with regular expression across all file systems and snapshots is enabled. At the same time, memory and CPU resources are saved.

In an implementation form of the first aspect, the device is further configured to obtain a second snapshot of the file system, scan the second snapshot of the file system to obtain a second scan of the nodes and the tree structure of the file system at a second time point, insert the second scan into the database, wherein the nodes of the first scan and second scan are merged, and update the index of the nodes in the database.

When multiple snapshots being backed up, indexing of the nodes in the database enables search and browse operations across multiple snapshots.

In an implementation form of the first aspect, the database comprises a nodes file and an edges file, the nodes file comprising information of the nodes of the file system, and the edges file comprising information of edges between the nodes of the file system.

The nodes file may be the primary file and may be simply an ordered list of all the nodes. Edges in the edges file may comprise a tuple of a child node, a parent node, and a snap mask (bitmap).

In an implementation form of the first aspect, the nodes file comprises metadata of each node, the metadata of each node comprising one or more of the following: a name, a size, a timestamp, and an identifier of the node, and the edges file comprises a child node to parent node relationship for the nodes in the nodes file.

In an implementation form of the first aspect, the metadata of each node is sorted in the nodes file, wherein the device is configured to create an index file, to index the nodes in the database, based on the nodes file, wherein the index file comprises an ordered list of a partial name of each node and an offset of the corresponding node in the nodes file.

The index file (nodes index) may be an ordered list of fixed-length partial node names (prefixes) and their corresponding offsets in the nodes file. It may be used to perform binary search in the nodes file (which itself is an unaligned blob of variable-length nodes).

In an implementation form of the first aspect, the device is configured to create a browser file based on the edges file, wherein the browser file comprises a parent node to child node relationship for the nodes in the nodes file, in a sorted order.

The browser file may be the same as the edges file, except that the child and parent fields are swapped and therefore the edges may be sorted numerically by parent, child instead of child, parent.

In an implementation form of the first aspect, the first scan comprises a first nodes file comprising information of the nodes of the file system at the first time point and a first edges file comprising information of edges between the nodes of the file system at the first time point, and wherein the device is further configured to merge the information in the first nodes file to the information in the nodes file of the database, set a first indication for each node in the first edges file to indicate that each node belongs to the first snapshot, and add the edges in the first edges file to the edges file of the database, and create a map file in the database to map the first indication to the first snapshot.

In this operation, a nodes file may be simply copied to or merged with the existing nodes file in the database. Since the nodes files are already sorted, the sort order can be maintained. A respective indication is used to identify a corresponding snapshot for each node.

In an implementation form of the first aspect, wherein the second snapshot comprises a second nodes file comprising information of the nodes of the file system at the second time point and a second edges file comprising information of edges between the nodes of the file system at the second time point, and the device is configured to merge the information in the second nodes file to the information in the nodes file of the database, determine whether an edge in the second edges file also exists in the first edges file, when an edge in the second edges file exists only in the second edges file, set a second indication for each node associated with the edge to indicate that the corresponding node belongs to the second snapshot, and add the edge to the edges file of the database, and when an edge in the second edges file also exists in the first edges file, add a second indication as appended to the first indication of each node associated with the edge in the edges file of the database, and map the second indication to the second snapshot in the map file.

In this operation, a new nodes file may be simply merged with the existing nodes file. For each edge not found in the latest scan, the second indication is set as is. For each edge common to both sides, the new indication, namely the second indication, is added as appended to the existing indication, namely the first indication.

In an implementation form of the first aspect, the device is configured to compare the first scan and the second scan, and create a delta edges file based on the first edges file and the second edges file, wherein the delta edges file comprises information of the edges that exist only in one of the first edges file and the second edges file.

This operation finds the delta, namely the difference, between any two snapshots. Notably, the two snapshots may be different. The snapshots do not have to be consecutive.

In an implementation form of the first aspect, the device is further configured to merge the information of the delta edges file to the information of edges in the edges file of the database, and create a new browser file based on the merged edges file.

This operation is very similar to the insert operation, but it can be faster and may use less memory. It merges a "delta" between two snapshots, with an existing database already containing one of the two snapshots. In this way, any new nodes and edges can be effectively added to those that already exist.

In an implementation form of the first aspect, the device is configured to receive a request to delete the first snapshot from the database, iterate all edges in the edges file of the database to determine whether a node associated with an edge is set with the first indication, and when the node is set with the first indication, delete the first indication set for the node, determine whether the node is set with another indication, and when the node is not set with the another indication, delete the node from the nodes file, and delete the edge associated with the node from the edges file, and delete the first indication from the map file.

A new database instance may thus be created from the source database, where a snapshot is requested to be deleted from the current files.

In an implementation form of the first aspect, the nodes file is sorted by a name of each node, and the edges file is sorted by a name of each child node.

In an implementation form of the first aspect, the device is configured to search for a node in the index file by using metadata of the node as a key.

For instance, a specific file or directory name may be used to search for the node. Optionally, the expression of the node may contain wildcards, such as "*" or "?".

In an implementation form of the first aspect, the device is further configured to search for a node in the database, based on the index of the nodes, simultaneously across one or more scans.

Optionally, a list of snapshots may be provided to limit the search to one or more particular snapshots. A default setting may be to perform the search across all snapshots in the database.

In an implementation form of the first aspect, the browser file is sorted by a name of each parent node.

In particular, the browser file can be used to walk the directory tree (path) from top to bottom, or to browse contents of a specific directory.

In an implementation form of the first aspect, the device is configured to browse one or more nodes using the browser file, and obtain one or more child nodes of the one or more nodes.

The browse operation may return all the children (files and directories) of each specified parent node (key), the parent node itself may not be listed.

A second aspect of the present disclosure provides a method for backing up a file system comprising a plurality of nodes arranged into a tree structure, the method comprising obtaining a first snapshot of the file system, scanning the first snapshot of the file system to obtain a first scan of the nodes and the tree structure at a first time point, inserting the first scan into a database, and indexing the nodes in the database.

In an implementation form of the second aspect, the method further comprises obtaining a second snapshot of the file system, scanning the second snapshot of the file system to obtain a second scan of the nodes and the tree structure of the file system at a second time point, inserting the second scan into the database, wherein the nodes of the first scan and second scan are merged, and updating the index of the nodes in the database.

In an implementation form of the second aspect, the database comprises a nodes file and an edges file, the nodes file comprising information of the nodes of the file system, and the edges file comprising information of edges between the nodes of the file system.

In an implementation form of the second aspect, the nodes file comprises metadata of each node, the metadata of each node comprising one or more of the following: a name, a size, a timestamp, and an identifier of the node, and the edges file comprises a child node to parent node relationship for the nodes in the nodes file.

In an implementation form of the second aspect, the metadata of each node is sorted in the nodes file, wherein the method comprises creating an index file, to index the nodes in the database, based on the nodes file, wherein the index file comprises an ordered list of a partial name of each node and an offset of the corresponding node in the nodes file.

In an implementation form of the second aspect, the method comprises creating a browser file based on the edges file, wherein the browser file comprises a parent node to child node relationship for the nodes in the nodes file, in a sorted order.

In an implementation form of the second aspect, the first scan comprises a first nodes file comprising information of the nodes of the file system at the first time point and a first edges file comprising information of edges between the nodes of the file system at the first time point, and wherein the method further comprises merging the information in the first nodes file to the information in the nodes file of the database, setting a first indication for each node in the first edges file to indicate that each node belongs to the first snapshot, and adding the edges in the first edges file to the edges file of the database, and creating a map file in the database to map the first indication to the first snapshot.

In an implementation form of the second aspect, wherein the second snapshot comprises a second nodes file comprising information of the nodes of the file system at the second time point and a second edges file comprising information of edges between the nodes of the file system at the second time point, and the method comprises merging the information in the second nodes file to the information in the nodes file of the database, determining whether an edge in the second edges file also exists in the first edges file, when an edge in the second edges file exists only in the second edges file, setting a second indication for each node associated with the edge to indicate that the corresponding node belongs to the second snapshot, and adding the edge to the edges file of the database, and when an edge in the second edges file also exists in the first edges file, adding a second indication as appended to the first indication of each node associated with the edge in the edges file of the database, and mapping the second indication to the second snapshot in the map file.

In an implementation form of the second aspect, the method comprises comparing the first scan and the second scan, and creating a delta edges file based on the first edges file and the second edges file, wherein the delta edges file comprises information of the edges that exist only in one of the first edges file and the second edges file.

In an implementation form of the second aspect, the method further comprises merging the information of the delta edges file to the information of edges in the edges file of the database, and create a new browser file based on the merged edges file.

In an implementation form of the second aspect, the method comprises receiving a request to delete the first snapshot from the database, iterating all edges in the edges file of the database to determine whether a node associated with an edge is set with the first indication, and when the node is set with the first indication, deleting the first indication set for the node, determining whether the node is set with another indication, and when the node is not set with the another indication, deleting the node from the nodes file, and deleting the edge associated with the node from the edges file, and deleting the first indication from the map file.

In an implementation form of the second aspect, the nodes file is sorted by a name of each node, and the edges file is sorted by a name of each child node.

In an implementation form of the second aspect, the method comprises searching for a node in the index file by using metadata of the node as a key.

In an implementation form of the second aspect, the method further comprises searching for a node in the database, based on the index of the nodes, simultaneously across one or more scans.

In an implementation form of the second aspect, the browser file is sorted by a name of each parent node.

In an implementation form of the second aspect, the method comprises browsing one or more nodes using the browser file, and obtaining one or more child nodes of the one or more nodes.

The method of the second aspect and its implementation forms provide the same advantages and effects as described above for the device of the first aspect and its respective implementation forms.

A third aspect of the present disclosure provides a computer program comprising a program code for carrying out, when implemented on a processor, the method according to the second aspect or any of its implementation forms. Further, the disclosure also relates to a computer program product comprising a computer readable medium and said mentioned computer program, wherein said computer program is included in the computer readable medium, and comprises of one or more from the group: read-only memory (ROM), programmable ROM (PROM), erasable PROM (EPROM), flash memory, electrically EPROM (EEPROM) and hard disk drive.

A fourth aspect of the disclosure suggests a device for backing up a file system includes a processor and a memory. The memory is storing instructions that cause the processor to perform the method according to the second aspect or any of its implementation forms.

The device according to the fourth aspect can be extended into implementation forms corresponding to the implementation forms of the method according to the second aspect. Hence, an implementation form of the device comprises the feature(s) of the corresponding implementation form of the method according to the second aspect.

The advantages of the devices according to the fourth aspect are the same as those for the corresponding implementation forms of the method according to the second aspect.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of embodiments, a functionality or step to be performed by external entities is not reflected in the description of a detailed element of that entity which performs that step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of embodiments in relation to the enclosed drawings, in which.

DETAILED DESCRIPTION OF EMBODIMENTS

Illustrative embodiments of method, device, and program product for efficient packet transmission in a communication system are described with reference to the figures. Although this description provides a detailed example of possible implementations, it should be noted that the details are intended to be exemplary and in no way limit the scope of the disclosure.

Moreover, an embodiment/example may refer to other embodiments/examples. For example, any description including but not limited to terminology, element, process, explanation and/or technical advantage mentioned in one embodiment/example is applicative to the other embodiments/examples.

Figure 1:
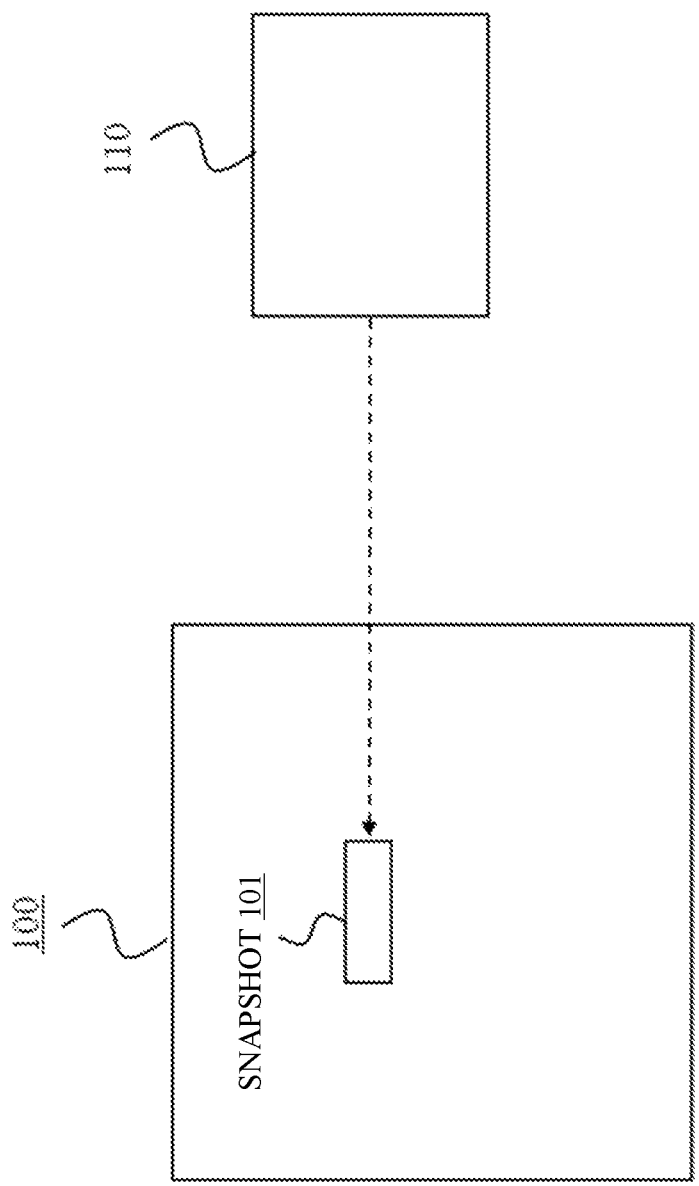
FIG. 1 shows a device according to an embodiment of the disclosure.

FIG. 1 shows a device 100 according to an embodiment of the disclosure. The device 100 is adapted for backing up a file system 110. Typically, the file system 110 comprises a plurality of nodes arranged into a tree structure. In particular, the device 100 is configured to obtain a first snapshot 101 of the file system 110. Further, the device 100 is configured to scan the first snapshot 101 of the file system 110 to obtain a first scan of the nodes and the tree structure of the file system 110 at a first time point, T1. The device 100 is then configured to insert the first scan into a database. Further, the device 100 is configured to index the nodes in the database.

The device 100 may comprise processing circuitry (not shown) configured to perform, conduct or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

Generally speaking, each node of a file system 110 may refer to a file or directory in (a snapshot's) the file system 110. Such file systems 110 may be hosted on virtual machines. A tree structure or tree diagram is a way of representing the hierarchical nature of a structure in a graphical form. Each node in a tree may have zero or more child nodes, which are below the node in the tree. That is, a child node can be a subdirectory or file of a parent directory. A node that has a child is called the child's parent node (parent directory), or ancestor node, or superior. A snapshot may refer to a graph (snap) representing a file system 110 at a specific moment in time (a snapshot at a given time).

Embodiments of this disclosure disclose a solution to the problem of indexing the file system names and paths of a long set of chains of backed-up snapshots. Particularly, the snapshots may be of a virtual machine hosting the file system 110.

In particular, according to an embodiment of the disclosure, the device 100 is further configured to obtain a second snapshot 102 of the file system 110. Accordingly, the device 100 is configured to scan the second snapshot 102 of the file system 110 to obtain a second scan of the nodes and the tree structure of the file system 110 at a second time point, T2. The device 100 is then configured to insert the second scan into a database, wherein the nodes of the first scan and second scan are merged. Further, the device 100 is configured to update the index of the nodes in the database.

Notably, at a later time point T2 (compared to T1), a new snapshot, namely, the second snapshot 102 of the file system 110, may be generated. New data or file may have been written into the file system 110 at T2. Once the new scan data has been inserted into the database, the index may be updated to facilitate efficient searching of any snapshot for any node. The database may be able to distinguish data belonging to different snapshots.

Figure 2:
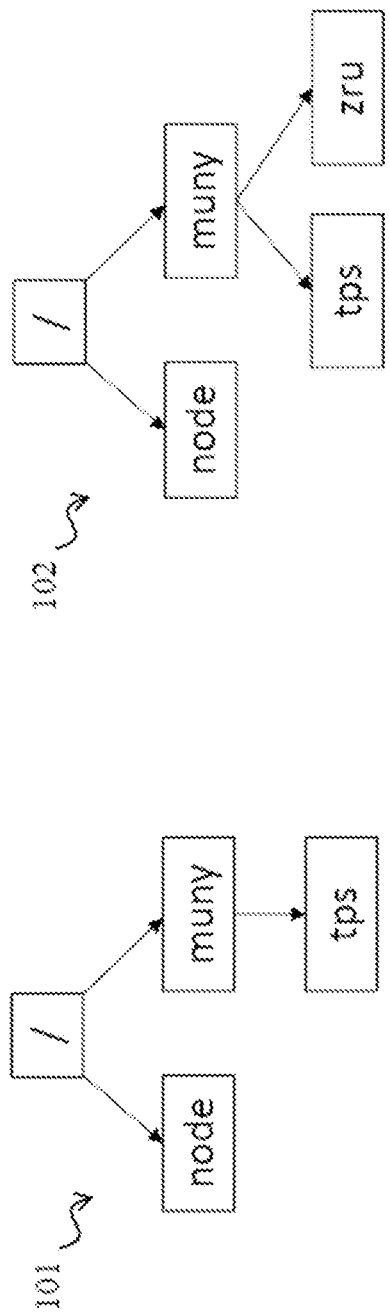
FIG. 2 shows a file structure according to an embodiment of the disclosure.

FIG. 2 shows a file structure according to an embodiment of the disclosure. The first snapshot 101 and the second snapshot 102, according to an embodiment of the disclosure, are as shown in FIG. 2. It can be seen that, new data "zru" has been written into the file system 110 at T2.

Optionally, the database comprises a nodes file and an edges file. The nodes file comprises information of the nodes of the file system 110, and the edges file comprises information of edges between the nodes of the file system 110. Examples of a nodes file and an edges file are shown in FIG. 2.

One possible embodiment of the disclosure is described below and will be referred to as the index database (IndexDB). In particular, IndexDB refers to a group of files containing the information about the paths and names of all the files and directories in a file system 110 within a chain of snapshots (e.g., 101, 102).

Possibly, each IndexDB instance consists of up to five files with a common base name (such as g1) and an extension (such as .nodes).

An IndexDB that contains only the nodes file and edges file is referred to as a raw scan. It contains the scanned nodes for a single snapshot (e.g., 101 or 102). However, it does not contain anything to identify a particular snapshot 101/102. The edges may be unsorted in the raw scan. This raw scan may be inserted into a suitable database that may already hold scans from one or more previous snapshots 101/102. Ideally, the format of the raw scan should be as close as possible to the database structure for optimal insertion performance.

When the raw scan is inserted into the database, the new data may be merged into the existing data such that the size increase of the database is proportional to the percentage change in the data from one snapshot 101/102 to the next. For example, when only 5% of the file system 110 has changed, then the database size should increase by 5% and not double in size when the next scan is inserted.

An IndexDB that contains the nodes and edges files as well as a snapmap file (but no index files) is referred to as a partial database. It contains nodes and edges from a number of snapshots (for example from 1 to 32 snapshots) as well as snapshot identifiers (IDs) for those snapshots. The edges file when only one snapshot 101/102 is present is usually unsorted. This database cannot be used for browse or search since there is no index available.

An IndexDB that contains not only the nodes, edges and snapmap files, but also a browser file and an index files, is referred to as a full database. The browser and index files are derived from the edges and nodes files. This database can be used for browse or search operations.

According to an embodiment of the disclosure, the nodes file comprises metadata of each node, the metadata of each node comprising one or more of the following: a name, a size, a timestamp, and an identifier of the node. The edges file comprises a child node to parent node relationship for the nodes in the nodes file.

The nodes file is the primary file in the database. The nodes file may be simply an ordered list of all the nodes. Typically, this is a binary file consisting of a file version header followed by any number of variable-length node records sorted primarily by name:

| Data type | Field | Size (bytes) | Description |
| --- | --- | --- | --- |
| byte[11] | Header | 11 | The file header and version. |
| Node[ ] | Nodes | * | Zero or more nodes. |

The file header is only present in the nodes file (no other files have a header) and consists of 11 bytes as follows:

| Data type | Field | Size (bytes) | Description |
| --- | --- | --- | --- |
| char[7] | Header | 7 | The string "IndexDB" (no terminating null). |
| uint16 | version_minor | 2 | The minor version number (0). |
| uint16 | version_major | 2 | The major version number (1). |

In this case, for v1.0 the version is 0x00010000.

Each node record consists of a variable number of bytes (depends on the name length). The minimum size of a node is therefore 36 bytes as follows:

| Data type | Field | Size (bytes) | Description |
| --- | --- | --- | --- |
| uint16 | name_length | 2 | The length of the name field. |
| char[ ] | name | >=0 | The name of the file or directory (no terminating null). |
| uint64 | size | 8 | The size in bytes. Size is set to −1 for directories. |
| uint64 | ctime | 8 | Time of the last status change (seconds since midnight on Jan. 1, 1970. |
| uint64 | mtime | 8 | Time of the last modification (seconds since midnight on Jan. 1, 1970. |
| uint16 | device_id | 2 | This equals st_dev (ID of device containing the node) to ensure the node is uniquely identifiable when all other fields are equal. Note that dev_t is defined as 64-bit as Linux can use either 16, 32 or 64-bit IDs. In practice IDs are always 16-bit. |
| ino_t | inode | 8 | This equals st_ino (inode number of the node) to ensure the node is uniquely identifiable when all other fields are equal. Note that ino_t is defined as 64-bit as Linux inodes can exceed 32 bits. |

It should be noted that, the actual byte offset of any node in the nodes file may be used as the key to that node (nodeId). The nodes in the nodes file may be sorted by: name, ctime, mtime, device_id, or inode. No flag is maintained to indicate whether a node is a file, directory or symlink. A node is a directory when its size==−1. Symlinks are traversed as regular files and/or directories.

The edges file is an ordered list of all edges (child node to parent node). It therefore represents the tree structure of the directories and files. It can be used to walk the directory tree (path) from bottom to top. Each child can have multiple parents (such as in different snapshots 101/102).

The edges may be unsorted in a raw scan (or in the first generation of a partial database). For instance, this is a binary file with 12 bytes per record.

| Data type | Field | Size (bytes) | Description |
| --- | --- | --- | --- |
| Edge[ ] | Edges | * | Zero or more edges. |

Each Edge consists of exactly 12 bytes (sorted numerically by child, parent):

| Data type | Field | Size (bytes) | Description |
| --- | --- | --- | --- |
| uint32 | child | 4 | The offset of the child node in the nodes file. |
| uint32 | parent | 4 | The offset of the parent node in the nodes file. |
| uint32 | mask | 4 | The 32-bit snap mask indicating which snaps (from 1 to 32) this child node belongs to. |

It should be noted that, the topmost child node may be assigned to a parent node with a pseudo ID of 0. The name of the topmost node may be blank, since it represents the root path "/", as shown in FIG. 2. The mask in a raw scan is 0.

A snapmap file may be a map of snap bits (1 to 32) to actual snap IDs (can be any string such as a globally unique identifier), sorted by snap bit (though the sort order is irrelevant). In particular, a snap bit refers to a bit used to uniquely identify a snapshot, and a snap ID refers to a string used to uniquely identify a snapshot. For instance, the snapmap file may be a binary file containing 0 to 32 variable-length records:

| Data type | Field | Size (bytes) | Description |
| --- | --- | --- | --- |
| SnapEntry[ ] | Snaps | * | Zero or more snap bits and their snap IDs. |

Each snapmap record consists of a variable number of bytes (depends on the snap ID length) as follows:

| Data type | Field | Size (bytes) | Description |
| --- | --- | --- | --- |
| uint32 | snap_bit | 4 | The snap bit from 1 to 32 (i.e. a number from $2^1$ to $2^{32}$). |
| uint32 | snap_id_length | 4 | The length of the snap_id field. |
| char[ ] | snap_id | >=1 | The snap ID (no terminating null). |

Each snapshot 101/102 will be represented by a single bit in a 32-bit unsigned integer, allowing for a maximum of 32 snapshots. A raw scan does not necessarily have a snapmap file.

Optionally, according to an embodiment of the disclosure, the metadata of each node is sorted in the nodes file. The device 100 may be configured to create an index file, to index the nodes in the database, based on the nodes file, wherein the index file comprises an ordered list of a partial name of each node and an offset of the corresponding node in the nodes file.

The index file (nodes index) is an ordered list of fixed-length partial node names (prefixes) and their corresponding offsets in the nodes file. It is used to perform binary search in the nodes file (which itself is an unaligned blob of variable-length nodes). For instance, this is a binary file with 16 bytes per record.

| Data type | Field | Size (bytes) | Description |
| --- | --- | --- | --- |
| NodeIndexEntry [ ] | Entries | * | Zero or more index entries. |

Each index entry consists of exactly 16 bytes (sorted numerically by name_prefix):

| Data type | Field | Size (bytes) | Description |
| --- | --- | --- | --- |
| char[12] | name_prefix | 12 | Up to the first 12 characters of the node's name padded with nulls. |
| uint32 | offset | 4 | The offset of the corresponding node in the nodes file. |

It should be noted that, the node name is truncated to the first 12 characters, and padded with nulls when shorter than 12 characters. After indexing the very first node (name is blank since this is the topmost directory), only every 64th node is indexed to keep the file and memory sizes small. No two index entries have the same name, so when more than 64 nodes have the same name prefix, then only one index entry is written. There are 64 or more nodes in-between any two index entries. The first entry for a given name prefix might not point to the first node matching that name prefix (since we skip every 64 nodes). A raw scan and a partial database do not have an index file. The index file is only required for search operations and can be generated from the nodes file. Therefore, the generation of this index file during the insert operation can be omitted, when it is only needed at a remote site.

According to an embodiment of the disclosure, the device 100 may be further configured to create a browser file based on the edges file, wherein the browser file comprises a parent node to child node relationship for the nodes in the nodes file, in a sorted order.

The browser file (browser index) may be exactly the same as the aforementioned edges file, except that the child and parent fields have been swapped and therefore the edges are sorted numerically by parent, child instead of child, parent. It can be used to walk the directory tree (path) from top to bottom, or to browse contents of a specific directory.

It should be noted that, a raw scan and a partial database do not have a browser file. The browser file is only required for browse and search operations and is generated from the edges file. Therefore, the generation of this browser file during the insert operation can be omitted, when it is only needed at a remote site.

Notably, this disclosure first solves the problem of indexing the file system names and paths of a single chain of backed-up snapshots of virtual machines. Having solved this problem, it is found that multiple searches in multiple chains can be initiated when needed.

The problem solved by the disclosed embodiments of the disclosure then is how to search for a path given a node name pattern, across multiple snapshots 101/202, using very low memory and CPU, and return the first search results within just a couple of seconds.

Accordingly, embodiments of the disclosure may comprise several operations including the following.

Scan of a snapshot 101/202 of a file system 110 to generate a raw scan of the nodes and their tree structure.

Insert of a raw scan of a specific snapshot 101/102 into a database (where index generation is optional), including a bitmap that identifies which specific snapshots 101/102 contain each node.

Indexing of the data to allow for search and browse operations across multiple snapshots 101/102.

Search for nodes by name, using an exact match, wildcard pattern or a regular expression. Results can be further filtered on size, timestamp, snapshot ID and/or path prefix.

Browse nodes by directory.

Delete a specific snapshot 101/102 from the database.

Diff any two snapshots 101/102 to create a small delta that can be uploaded to a remote site.

Apply diff between any two snapshots 101/102 to a database in order to insert a missing snapshot 101/102 using just a small delta.

Scan Operation

This operation can be performed by the device 100 to recursively scan a directory (mounted file system) (from the requested path downwards), and add all nodes (and corresponding edges) found to a scan IndexDB instance (only has 2 of the 5 files normally in an IndexDB and no snap ID is stored), as described in the previous embodiments.

A recursive scan (e.g., depth-first search (DFS) traversal) of the directory tree (mounted file system) is performed, starting at a specified top-level directory (virtual root). The top-level directory is stored with a blank name since it is the root.

The "parent" of this top-level directory is given an ID of 0 and is not stored in the IndexDB.

For each node encountered:

The unique combination of 16-bit device ID and 64-bit inode ID are used as key. Particularly, a device ID is an identifier of the device on which a node (file or directory) is stored, and an inode ID is an identifier of a node representing a file or directory in a (typically Posix-based) file system.

When the node is a hard link to another node (nlinks>1), then the name is hashed and added to the key. This is to prevent adding duplicate nodes when the exact same node is encountered later on.

For soft links (symbolic links), link traversal is performed to a maximum depth of 32 (to prevent getting stuck in a recursive loop—such nodes are ignored).

Special handling is performed for soft links in foreign file systems such as Windows.

The node metadata (e.g., name, size, timestamps, device, inode) is added to a structure in memory that is limited to a maximum size (such as 32 megabytes (MB) which is sufficient to hold 500,000 nodes).

The child and parent keys for the node are written to a temporary edges file.

Once the nodes structure is full, it is sorted primarily by name and written to a temporary file. The nodes structure is then cleared and the scan continues.

Once the scan is complete, a merge sort is performed to merge pairs of node files until only one file remains (which is then merged with any nodes remaining in memory). The final merge is written to the sorted nodes file for the raw scan, while maintaining a map of node key to file offset. Typically, there are only about 5 merges required in total.

The temporary edges file is rewritten to the final edges file for the raw scan, by replacing the child-parent keys with the node offsets.

Insert Operation

This operation can be performed by the device 100 to merge a raw scan corresponding to a given snap ID, with an existing "source" database, effectively adding the new nodes and edges found to those that already exist. A new IndexDB instance is created (the "output" database), leaving the original input files (source and scan) unchanged. For example, a maximum of 32 snapshots can be inserted into a single IndexDB instance, before previous snapshots have to be deleted to make room for new ones.

For a new IndexDB:

The nodes file is simply copied to the new database as it is.

The edges file is rewritten, setting bit 0 of the 32-bit snap mask for each node to indicate that each node belongs to snap 0.

The unique name of the snap is written to a snapmap file, to map snap 0 to its name.

According to an embodiment of the disclosure, the first scan comprises a first nodes file comprising information of the nodes of the file system 110 at T1 and a first edges file comprising information of edges between the nodes of the file system 110 at T1, and wherein the device 100, as shown in FIG. 1, may be further configured to merge the information in the first nodes file to the information in the nodes file of the database. Further, the device 100 may be configured to set a first indication for each node in the first edges file to indicate that each node belongs to the first snapshot 101, and add the edges in the first edges file to the edges file of the database. The device 100 may be then configured to create a map file in the database to map the first indication to the first snapshot 101.

For an existing IndexDB:

The unique name of the snapshot is appended to the snapmap file, to map snapshot N to its name, where N is the next free snapshot slot.

The new nodes file is simply merged with the existing nodes file. Since the files are already sorted, the sort order is maintained using O(1) memory in O(N) time. A map is maintained to map the old node offsets to the new offsets for both nodes files.

At the same time, when index files are required, as the first node and thereafter every 64th node (and only if the name prefix differs from the previous prefix) is output, an entry is written to the index file mapping just the first 12 characters of the name to the offset in the nodes file.

The child-parent IDs in the two edges files are replaced with the new offsets using the two maps from step 2, and the two files are then both sorted.

The two edges files are merged:

For each edge not found in the latest scan, the snap mask is written as is.

For each edge common to both sides, the new snap bit as appended to the existing mask.

For each new edge, the snap mask only contains the new snap bit.

When index files are required, create the new browser file by transposing the new edges from child, parent, mask to parent, child, mask and resorting.

In this respect, according to an embodiment of the disclosure, the second snapshot 102 may comprise a second nodes file comprising information of the nodes of the file system 110 at T2 and a second edges file comprising information of edges between the nodes of the file system 110 at T2. The device 100 may be further configured to merge the information in the second nodes file to the information in the nodes file of the database. Then the device 100 may be configured to determine whether an edge in the second edges file also exists in the first edges file. When an edge in the second edges file exists only in the second edges file, the device 100 may be configured to set a second indication for each node associated with the edge to indicate that the corresponding node belongs to the second snapshot, and add the edge to the edges file of the database. When an edge in the second edges file also exists in the first edges file, the device 100 may be configured to add a second indication as appended to the first indication of each node associated with the edge in the edges file of the database. Further, the device 100 may be configured to map the second indication to the second snapshot 102 in the map file.

Delete Operation

This operation may be performed by the device 100, wherein a new IndexDB instance is created from the source database where the requested snap ID (bit) is deleted from the snapmap, edges and nodes.

This operation is similar to insert in terms of keeping O(1) memory while iterating lists. The order of operation is however different as following:

Remove the snap ID from the snapmap and get the snap bit that is being removed.

Find removed nodes by iterating the edges to find those that only have this snap bit set (and therefore can be removed) together with the child node IDs they reference. Again, iterate the edges to exclude any of the found nodes that are still being referenced by any other snapshot (therefore may not be removed).

Remove Nodes by writing all nodes not being removed to the output database, maintaining a map of previous node IDs to new node IDs. At the same time, when index files are required then index every 64th node (as for the insert operation above).

Remove edges, by writing all edges that do not have only this snap bit set (and therefore must not be removed) to the new edges file, replacing the previous parent and child node IDs with the new ID values (from the map created during the removal of the nodes), simultaneously clearing this snap bit from each snap mask as it is written.

When index files are required, create browser file (as for the insert operation above).

According to an embodiment of the disclosure, the device 100 may be configured to receive a request to delete the first snapshot 101 from the database. Accordingly, the device 100 may be configured to iterate all edges in the edges file of the database to determine whether a node associated with an edge is set with the first indication, and when the node is set with the first indication, the device 100 may be configured to delete the first indication set for the node. Further, the device 100 may be configured to determine whether the node is set with another indication, and when the node is not set with the another indication, the device 100 may be configured to delete the node from the nodes file, and delete the edge associated with the node from the edges file. Then, the device 100 may be configured to delete the first indication from the map file.

Diff Operation

This operation may be performed by the device 100 to find the delta between any two snap IDs. Obviously the two IDs must be different. The corresponding snapshots do not have to be consecutive.

All nodes (and corresponding edges) that differ between the two snapshots are written to a partial IndexDB instance (only has 3 of the 5 files normally in a full IndexDB and only the two snap IDs being diffed are stored).

Unlike a raw scan that includes all edges that currently exist (but not any that no longer exist), a "delta" only includes edges that are either new or have been deleted, and therefore it is a fraction of the size of a full scan.

This is a very fast operation that uses minimal memory as follows:

Find the two snap bits corresponding to the supplied snap IDs.

Find delta edges, by iterating the edges to find only those edges that belong to either snap1 or snap2 (but not both). These are the edges that have changed. The snap mask is reduced to contain only the single snap bit corresponding to snap1 or snap2, but no other snapshot. At the same time the node IDs referenced by these edges are added to a set.

Write nodes delta, by sorting the set of referenced node IDs and write the corresponding nodes to the output database, maintaining a map of previous node IDs to new node IDs.

Write edges delta, by writing the delta edges to the new edges file, replacing the previous parent and child node IDs with the new ID values (from the map created during the diff of the edges).

Write the new snapmap file with only the two snap IDs being diffed.

According to an embodiment of the disclosure, the device 100 may be configured to compare the first scan and the second scan. Further, according to an embodiment of the disclosure, the device 100 may be configured to create a delta edges file based on the first edges file and the second edges file, wherein the delta edges file comprises information of the edges that exist only in one of the first edges file and the second edges file.

Apply Diff Operation

This operation may be performed by the device 100, and is very similar to an insert operation but it is faster and uses less memory. It merges a "delta" between two snap IDs, with an existing "source" database already containing one of the snap IDs, effectively adding any new nodes and edges to those that already exist. A new IndexDB instance is created (the "output" database), leaving the original input files (source and delta) unchanged.

It should be noted that, the snapshots being inserted do not have to be consecutive, and deltas can be applied in any order that is desired. Once all deltas have been applied, the resulting IndexDB will be binary identical to the original IndexDB (assuming they both now contain the same set of snapshots).

The insert is actually a merge operation, since most objects are ordered by a certain criteria, the merge keeps the criteria while using O(1) memory. The merge is done in the following order to maintain some needed information:

Determine snap IDs/bits—the two snap IDs (and their corresponding snap bits) are extracted from the delta's snapmap file. One snap ID/bit must already exist in the source database, while the other snap ID/bit must not already exist and is added to the new snapmap.

Merge all nodes from the delta and source database exactly the same way as for the insert operation above, maintaining two maps of the previous node IDs to new node IDs. At the same time, index every 64th node (as for the insert operation above).

Merge edges, similar to the insert operation above, where the parent and child node IDs in the two sets of edges being merged, are simply replaced with the new ID values, and these two sets of edges are then each sorted in order to perform a merge.

However, for the apply diff operation:

For each edge not found in the delta, when the snap mask contains snap1 then snap2 is also added to the mask, else the snap mask is written as is.

For each edge common to both sides, the snap mask is combined with the delta mask. (When the edge was already present but not for snap1, then snap2 has now been added, else if the edge was present for snap1 but no longer for snap2 then the mask is effectively unchanged.)

For each new edge, the snap mask already contains only the new snap bit.

Create the new browser file (as for the insert operation above).

Accordingly, based on the previous embodiment of the disclosure, the device 100 may be further configured to merge the information of the delta edges file to the information of edges in the edges file of the database, and create a new browser file based on the merged edges file.

Browse Operation

The browse operation may be performed by the device 100 and may accept the following.

Optional snap ID to limit the browse to (the default is to browse all snaps).

Either a list of keys (parent node IDs) to browse, or the absolute path to the directory to browse. The keys are usually different versions of the same directory (from different snaps). When a path is specified, the list of keys is derived from this path.

It should be noted that, the browse operation will return the children (files and directories) of each parent node (key) specified (the parent itself is not listed), and will not recursively enter any child directories found. The top-level directory is "/" regardless of the path that was specified for the scan operation.

Either the path or a list of keys must be specified. For example, when the keys 200, 305 are specified then child nodes of the nodes at files offsets 200 and 305 will be returned. When instead the path /a/b/c is specified then the keys will be set to the node ID/s corresponding to the node c (more than one if multiple versions of this path exist).

For each node the node ID, snap ID, name, size and timestamps are returned. (The parent ID is not included.) Notably, no flag is maintained to indicate whether a node is a file, directory or symlink. When the size is −1, then it is a directory.

When a specific snap ID is not specified then each node is duplicated multiple times (once for each snap ID).

In some implements, according to an embodiment of the disclosure, the browser file may be sorted by a name of each parent node.

Optionally, according to an embodiment of the disclosure, the device 100 may be configured to browse one or more nodes using the browser file. The device 100 may be further configured to obtain one or more child nodes of the one or more nodes.

Search Operation

The search operation may be performed by the device 100 and may accept the following.
- the expression to search for. This can be a specific file or directory name, or it may contain wildcards (* or ? only).
- a list of snap IDs to limit the search to (the default is to search all snaps).
- an absolute path to the directory at which to begin the search (the default is "/").
- parameters such as from_size, until_size, from_ctime, until_ctime, from_mtime and until_mtime to limit the search.

The search operation is the most important aspect of the disclosure, but the resulting procedure is simple: When a path was specified to limit the search, then the end nodes corresponding to the specified directory are determined (as for the browse operation above). These "roots" are used as a filter following the actual search for the nodes. In the case that the expression being searched starts with one or more characters other than a wildcard, we can find the approximate region in the nodes file where matching nodes are located using the index and a binary search on this search prefix. In any other case (e.g., expression starts with a wildcard character, or the search is case-insensitive), we have to traverse the entire nodes list. We search for the first index entry greater than or equal to the name prefix. The matching nodes can then be found between the offset, that is pointed to by the previous index entry, up to the offset pointed to by either the current index entry (if greater than the name prefix) else the next index entry. Regardless of whether we use the index to determine the start and end offsets for the search, or whether we traverse the entire nodes file, the nodes are read into memory in blocks, using the index to delineate these blocks. Therefore, we read at least 64 nodes at a time since the index has an entry for every 64th node. In the event that there are thousands of nodes in-between two index entries, we limit the buffer size to 32 kilobytes (KB) (enough space for about 700 nodes). When the search uses wildcards or is case-insensitive, then a regular expression is used to match each node. Once we have results, we start to climb up the paths using the edges to DFS search for the root of the search. Any found result is sent to the user performing the query immediately. In this way, the graphical user interface (GUI) can show results quickly.

In some implements, according to an embodiment of the disclosure, the nodes file may be sorted by a name of each node, and the edges file may be sorted by a name of each child node.

Optionally, according to an embodiment of the disclosure, the device 100 may be configured to search for a node in the index file by using metadata of the node as a key.

According to another embodiment of the disclosure, the device 100 may be configured to search for a node in the database, based on the index of the nodes, simultaneously across one or more scans.

Figure 3:
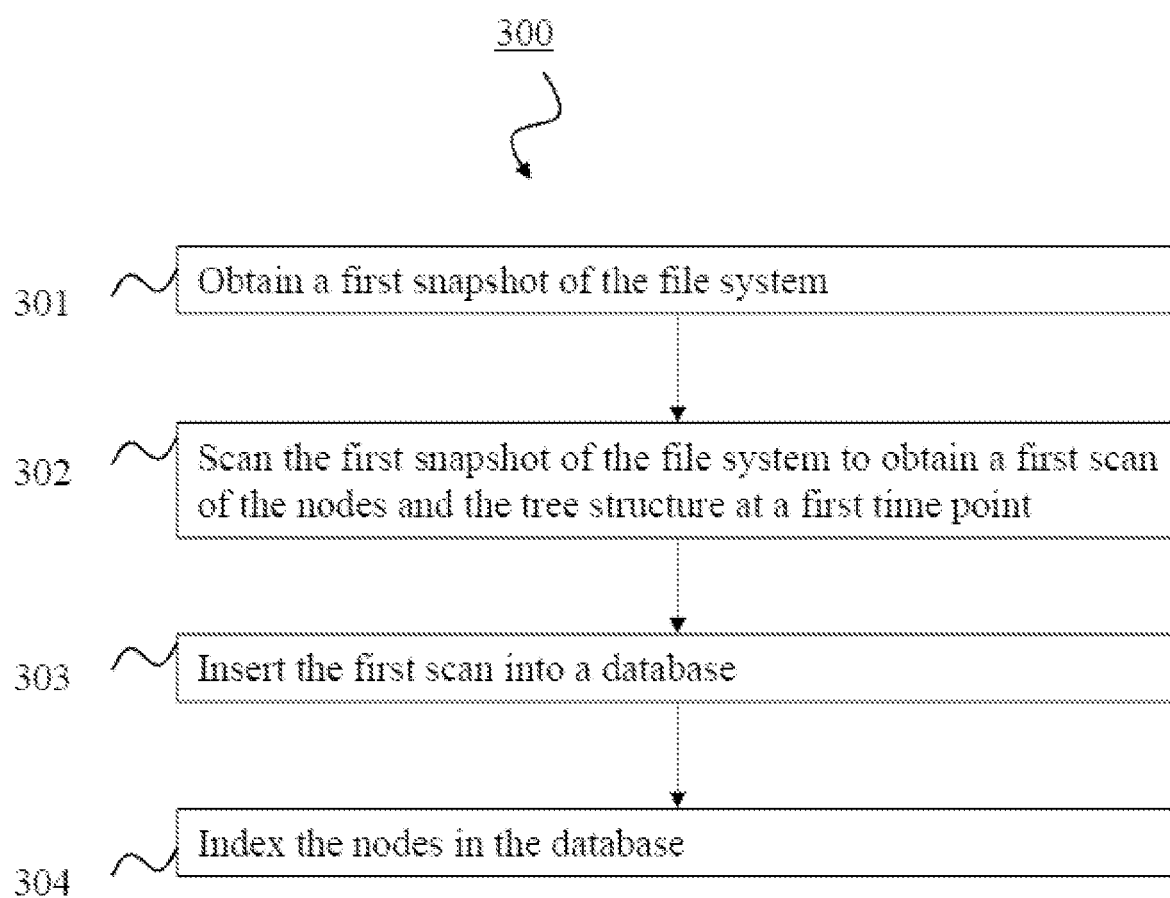
FIG. 3 shows a method according to an embodiment of the disclosure.

FIG. 3 shows a method 300 for backing up a file system 110 comprising a plurality of nodes arranged into a tree structure according to an embodiment of the disclosure. In a particular embodiment of the disclosure, the method 300 is performed by a device 100 shown in FIG. 1. The method 300 comprises a step 301 of obtaining a first snapshot 101 of the file system 110, a step 302 of scanning the first snapshot 101 of the file system 110 to obtain a first scan of the nodes and the tree structure at a first time point, a step 303 of inserting the first scan into a database, and a step 304 of indexing the nodes in the database.

According to embodiments of this disclosure, a combination of dedicated data structures and algorithms are utilized. As a result, a problem of how to search for a path given a node name pattern, across multiple snapshots, is solved. This solution can be executed with a very low memory requirement, and low CPU, so multiple searches can be executed on each machine. The first search results can be returned within just a couple of seconds.

To summarize, the present disclosure proposes two methods: a single file system search method and a global search method.

Single file system search method:

The nodes file is a dedicated binary data structure where each record has a variable-length name followed by several fixed-length metadata fields (size, timestamps), and is sorted by the names.

The index file is a dedicated binary data structure with fixed length records. This is a partial index having an entry for every node of the N nodes where the stored name is truncated to X characters. The entries are sorted. The edges and browser files are dedicated binary data structures with fixed length records which hold the child to parent or parent to child relationships respectively, between each node in the nodes file, using the nodes file offset as the parent or child ID. Each record also holds a bitmap that indicates which snapshots each node belongs to. These records are sorted by child or parent ID respectively to allow for search or browse operations.

Using the fixed portion of the search expression prefix, the closest matches in the index can be found, using an efficient binary search. Hence the offsets to the start and end of the region can be quickly found, where all possible matches might be found in the nodes data structure. The nodes structure can be searched in the following manner.

Search for a specific name, or nodes starting with a prefix can be optimized, to a binary search.

A regular expression library can be used to search for names very quickly, especially once limiting the search region using the index.

When there is a pattern expression, look in the binary-filtered region only.

The nodes data structure is compact which makes the regular expression and binary search faster than any other currently known method.

Record (node) offsets in the data structure are used as keys to the names.

Once the names (and their keys) have been found, the full path can be found using other compact and very efficient data structures (edges) for graph traversal.

With respect to the global search method, metadata of each file system is stored in a separate set of data structures, where each set contains multiple snapshots. When a search is initiated, the search is performed in the file systems in parallel, and the separate result streams are joined into one unified result output stream, as they are received.

Notably, the parallelism can be limited to a constant number of file systems at any given time.

The disclosed solution can be implemented in a number of languages. A preferred solution was implemented in C++. Optionally, it can also be implemented in Python. Memory usage is limited by performing a merge sort natively, but such a sort is also possible using external tools such as the LINUX sort utility. The lexographical sort order is locale dependent and can be modified for different languages. For a desired performance, pure binary file formats were used, but the solution was also shown to work using text-based file formats. The index is based on the first N characters of the node name, however an index could also be built using the last N characters of the name allowing for fast wildcard searches on the file extension (such as *.jpeg).

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM, a PROM, an EPROM, a Flash memory, an EEPROM, or a hard disk drive.

Moreover, it is realized by the skilled person that embodiments of the device 100 comprises the necessary communication capabilities in the form of e.g., functions, means, units, elements, etc., for performing the solution. Examples of other such means, units, elements and functions are processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the device 100 may comprise, e.g., one or more instances of a CPU, a processing unit, a processing circuit, a processor, an ASIC, a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A device for backing up a file system, comprising:
   an interface;
   a non-transitory memory storing computer-executable instructions; and
   one or more processors coupled to the interface and the non-transitory memory and configured to execute the computer-executable instructions that when executed by the one or more processors cause the one or more processors to be configured to:
   obtain a first snapshot of a file system comprising a plurality of nodes arranged into a tree structure;
   scan the first snapshot to obtain a first scan of the plurality of nodes and the tree structure at a first time point, wherein the first scan comprises a first nodes file comprising first nodes of the plurality of nodes;
   insert the first scan into a database, wherein the database comprises a database nodes file and a database edges file, wherein the database nodes file comprises information of the plurality of nodes, and wherein the database edges file comprises, in a sorted order, information of a child node to a parent node relationship for the plurality of nodes;
   create, in the database, a browser file based on the database edges file, wherein the browser file comprises, in a sorted and numerically opposite order to the database edges file, a parent node to child node relationship for the plurality of nodes; and
   index the plurality of nodes in the database to obtain a node index.

2. The device of claim 1, wherein the computer-executable instructions further cause the one or more processors to be configured to:
   obtain a second snapshot of the file system;
   scan the second snapshot to obtain a second scan of second nodes of the plurality of nodes and a second tree structure of the file system at a second time point, wherein the second scan comprises information of the second nodes of the plurality of nodes;
   insert the second scan into the database to merge the first nodes and the second nodes; and
   update the node index in the database after inserting the second scan into the database.

3. The device of claim 1, wherein the database edges file comprises information of edges between the plurality of nodes.

4. The device of claim 3, wherein the database nodes file further comprises metadata of each of the plurality of nodes, and wherein the metadata comprises one or more of a name of a corresponding node of the plurality of nodes, a size of the corresponding node, a timestamp of the corresponding node, or an identifier of the corresponding node.

5. The device of claim 4, wherein the metadata is sorted in the database nodes file, wherein the computer-executable instructions further cause the one or more processors to be configured to create a node index file, based on the database nodes file, to index the plurality of nodes in the database, and wherein the node index file comprises an ordered list of a partial name of each of the plurality of nodes and an offset of the corresponding node in the database nodes file.

6. The device of claim 5, wherein the computer-executable instructions further cause the one or more processors to be configured to search for a first node in the node index file using first metadata of the first node as a key.

7. The device of claim 1, wherein the computer-executable instructions further cause the one or more processors to be configured to sort, using a name of each parent node, the browser file.

8. The device of claim 1, wherein the computer-executable instructions further cause the one or more processors to be configured to:
   browse one or more of the plurality of nodes using the browser file; and
   obtain one or more child nodes of the one or more of the plurality of nodes.

9. The device of claim 4, wherein the computer-executable instructions further cause the one or more processors to be configured to:
sort, using a name of each node, the database nodes file; and
sort, using a name of each child node, the database edges file.

10. The device of the claim 2, wherein the second scan comprises a second nodes file comprising information of the second nodes of the plurality of nodes and a second edges file comprising information of second edges between the second nodes, and wherein the computer-executable instructions further cause the one or more processors to be configured to:
merge the information of the second nodes to the information of the plurality of nodes;
set a first indication for each of the second nodes in the second edges file to indicate that each of the second nodes belongs to the first snapshot;
add the second edges to the database edges file; and
create a map file in the database to map the first indication to the first snapshot.

11. The device of claim 10, wherein the computer-executable instructions further cause the one or more processors to be configured to:
receive a request to delete the first snapshot from the database;
iterate all edges in the database edges file to determine whether a first node associated with a first edge is set with the first indication;
delete the first indication that is set for the first node when the first node is set with the first indication;
determine whether the first node is set with another indication;
when the first node is not set with the other indication:
delete the first node from the database nodes file;
delete the first edge from the database edges file; and
delete the first indication from the map file.

12. The device of claim 2, wherein the second scan of the second nodes comprises a second nodes file comprising information of the second nodes and a second edges file comprising information of second edges between the second nodes, and wherein the computer-executable instructions further cause the one or more processors to be configured to:
merge the information of the second nodes to the information of the plurality of nodes in the database nodes file;
determine whether an edge in the second edges file exists in a first edges file of the first scan;
when the edge in the second edges file exists in the second edges file and does not exist in the database edges file:
set a second indication for each node associated with the edge in the second edges file to indicate that a first corresponding node belongs to the second snapshot; and
add the edge in the second edges file to the database edges file;
add a third indication as appended to a first indication of each of the second nodes associated with the edge in the second edges file when the edge in the second edges file exists in both the second edges file and the database edges file; and
map the second indication or the third indication to the second snapshot in a map file in the database.

13. The device of claim 12, wherein the computer-executable instructions further cause the one or more processors to be configured to:
compare the first scan and the second scan; and
create a delta edges file based on the first edges file of the first scan and the second edges file, wherein the delta edges file comprises information of fourth edges that exist in one of the database edges file or the second edges file.

14. The device of claim 13, wherein the computer-executable instructions further cause the one or more processors to be configured to:
merge the information of the fourth edges to information of fifth edges in the database edges file to obtain a merged edges file; and
create a new browser file based on the merged edges file.

15. The device of claim 1, wherein the computer-executable instructions further cause the one or more processors to be configured to search for a database node of the plurality of nodes in the database, based on the node index, and simultaneously across one or more scans.

16. A method comprising:
obtaining a first snapshot of a file system comprising a plurality of nodes arranged into a tree structure;
scanning the first snapshot to obtain a first scan of the plurality of nodes and the tree structure at a first time point, wherein the first scan comprises a first nodes file comprising first nodes of the plurality of nodes;
inserting the first scan into a database, wherein the database comprises a database nodes file and a database edges file, wherein the database nodes file comprises information of the plurality of nodes, and wherein the database edges file comprises information of a child node to a parent node relationship for the plurality of nodes;
creating a browser file based on the database edges file, wherein the browser file comprises, in a sorted and numerically opposite order to the database edges file, a parent node to child node relationship for the plurality of nodes; and
indexing the plurality of nodes in the database to obtain a node index.

17. The method of claim 16, further comprising:
obtaining a second snapshot of the file system;
scanning the second snapshot to obtain a second scan of second nodes of the plurality of nodes and a second tree structure of the file system at a second time point, wherein the second scan comprises information of the second nodes of the plurality of nodes;
inserting the second scan into the database to merge the first nodes and the second nodes; and
updating the node index in the database after inserting the second scan into the database.

18. A computer program product comprising a non-transitory computer readable storage medium storing computer-executable instructions that when executed by one or more processors, cause an apparatus to:
obtain a first snapshot of a file system comprising a plurality of nodes arranged into a tree structure;
scan the first snapshot to obtain a first scan of the plurality of nodes and the tree structure at a first time point, wherein the first scan comprises a first nodes file comprising first nodes of the plurality of nodes;
insert the first scan into a database, wherein the database comprises a database nodes file and a database edges file, wherein the database nodes file comprises information of the plurality of nodes, and wherein the database edges file comprises information of a child node to a parent node relationship for the plurality of nodes;

create a browser file based on the database edges file, wherein the browser file comprises, in a sorted and numerically opposite order to the database edges file, a parent node to child node relationship for the plurality of nodes; and index the plurality of nodes in the database to obtain a node index.

19. The computer program product of claim 18, wherein the computer-executable instructions further cause the apparatus to:

obtain a second snapshot of the file system;

scan the second snapshot to obtain a second scan of second nodes of the plurality of nodes and a second tree structure of the file system at a second time point, wherein the second scan comprises information of the second nodes of the plurality of nodes;

insert the second scan into the database to merge the first nodes and the second nodes; and update the node index in the database after inserting the second scan into the database.

20. The computer program product of claim 18, wherein the database nodes file further comprises metadata of each of the plurality of nodes, and wherein the metadata comprises one or more of a name of a corresponding node of the plurality of nodes, a size of the corresponding node, a timestamp of the corresponding node, or an identifier of the corresponding node.

* * * * *